(12) United States Patent
Li et al.

(10) Patent No.: US 12,242,491 B2
(45) Date of Patent: Mar. 4, 2025

(54) METHOD AND SYSTEM OF RETRIEVING ASSETS FROM PERSONALIZED ASSET LIBRARIES

(71) Applicant: Microsoft Technology Licensing, LLC, Redmond, WA (US)

(72) Inventors: Ji Li, San Jose, CA (US); Dachuan Zhang, San Mateo, CA (US); Amit Srivastava, San Jose, CA (US); Adit Krishnan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/716,653

(22) Filed: Apr. 8, 2022

(65) Prior Publication Data

US 2023/0325391 A1    Oct. 12, 2023

(51) Int. Cl.
*G06F 16/2457* (2019.01)
*G06F 16/22* (2019.01)
(Continued)

(52) U.S. Cl.
CPC .... *G06F 16/24578* (2019.01); *G06F 16/2228* (2019.01); *G06F 16/24575* (2019.01); *G06F 18/2155* (2023.01); *G06N 20/00* (2019.01)

(58) Field of Classification Search
CPC ........... G06F 16/24578; G06F 16/2228; G06F 16/24575; G06F 18/2155; G06N 20/00
See application file for complete search history.

(56) References Cited

U.S. PATENT DOCUMENTS 8,250,613 B2    8/2012  Faulkner et al.
10,783,456 B2   9/2020  Strope et al.
(Continued)

FOREIGN PATENT DOCUMENTS

EP      3794836 A1    3/2021
WO   2020051249 A1    3/2020

OTHER PUBLICATIONS

"Application as Filed in U.S. Appl. No. 17/538,880", filed Nov. 30, 2021, 41 Pages.
(Continued)

*Primary Examiner* — Jensen Hu
(74) *Attorney, Agent, or Firm* — NovoTechIP International PLLC

(57) ABSTRACT

A system and method and for retrieving assets from a personalized asset library includes receiving a search query for searching for assets in one or more asset libraries, the one or more asset libraries including a personalized asset library; encoding the search query into embedding representations via a trained query representation machine-learning (ML) model; comparing, via a matching unit, the query embedding representations to a plurality of asset representations, each of the plurality of asset representations being a representation of one of the plurality of candidate assets; identifying, based on the comparison, at least one of the plurality of the candidate assets as a search result for the search query; and providing the identified plurality of candidate assets for display as the search result. The plurality of asset representations for the one or more assets in the personalized content library are generated automatically without human labeling.

16 Claims, 12 Drawing Sheets

(51) Int. Cl.
*G06F 18/214* (2023.01)
*G06N 20/00* (2019.01)

(56) References Cited

U.S. PATENT DOCUMENTS

| | | | |
|---|---|---|---|
| 11,003,856 B2 | 5/2021 | Kiros et al. | |
| 11,416,534 B2 | 8/2022 | Wang | |
| 11,533,495 B2 | 12/2022 | Jain et al. | |
| 11,620,331 B2 | 4/2023 | Kislyuk | |
| 11,768,837 B1* | 9/2023 | Newman | G06F 16/24575 707/722 |
| 2005/0257240 A1 | 11/2005 | Faulkner et al. | |
| 2011/0047226 A1 | 2/2011 | Gabriel et al. | |
| 2011/0307425 A1 | 12/2011 | Wang et al. | |
| 2013/0166543 A1* | 6/2013 | MacDonald | G06F 16/9535 707/E17.084 |
| 2013/0166587 A1 | 6/2013 | Berry | |
| 2015/0034357 A1 | 2/2015 | Dower et al. | |
| 2015/0067541 A1 | 3/2015 | Owens et al. | |
| 2015/0347357 A1 | 12/2015 | Maughan et al. | |
| 2016/0042050 A1 | 2/2016 | Chen et al. | |
| 2016/0092447 A1 | 3/2016 | Venkataraman et al. | |
| 2017/0006357 A1 | 1/2017 | Obara | |
| 2017/0098283 A1* | 4/2017 | Rajan | G06Q 50/01 |
| 2017/0337265 A1* | 11/2017 | Garrett | G06F 16/907 |
| 2018/0068023 A1 | 3/2018 | Douze et al. | |
| 2018/0113888 A1 | 4/2018 | Peña Muñoz | |
| 2019/0007755 A1 | 1/2019 | Obara | |
| 2019/0065492 A1 | 2/2019 | Cheng et al. | |
| 2019/0102397 A1* | 4/2019 | Hornkvist | G06F 16/24578 |
| 2019/0163766 A1* | 5/2019 | Gulati | G06F 16/532 |
| 2019/0258713 A1 | 8/2019 | Kiros et al. | |
| 2019/0258722 A1* | 8/2019 | Guo | G06F 16/9024 |
| 2019/0303402 A1 | 10/2019 | Berry | |
| 2019/0347556 A1* | 11/2019 | Yim | G06F 18/22 |
| 2020/0413154 A1 | 12/2020 | Obara | |
| 2021/0133264 A1 | 5/2021 | Tiwari | |
| 2021/0191925 A1 | 6/2021 | Sianez | |
| 2021/0264203 A1 | 8/2021 | Fuxman et al. | |
| 2021/0295822 A1 | 9/2021 | Tomkins | |
| 2022/0075961 A1* | 3/2022 | Cavallari | G06F 40/20 |
| 2022/0138170 A1* | 5/2022 | Misiewicz | G06N 3/045 707/737 |
| 2022/0156298 A1 | 5/2022 | Mahmoud | |
| 2022/0245706 A1* | 8/2022 | Chaidaroon | G06F 16/9535 |
| 2023/0169110 A1 | 6/2023 | Li et al. | |
| 2023/0244727 A1* | 8/2023 | Liu | G06N 20/20 707/706 |
| 2023/0306087 A1 | 9/2023 | Krishnan et al. | |
| 2024/0248901 A1 | 7/2024 | Krishnan | |

OTHER PUBLICATIONS

Hassan, et al., "Multi-Modal Information Integration for Document Retrieval", In Proceedings of 12th International Conference On Document Analysis And Recognition, Aug. 25, 2013, pp. 1200-1204.
"International Search Report and Written Opinion Issued in PCT Application No. PCT/US23/010536", Mailed Date: Apr. 26, 2023, 10 Pages.
Chi, et al., "Zero-Shot Cross-Media Embedding Learning With Dual Adversarial Distribution Network", In Journal of IEEE Transactions on Circuits and Systems for Video Technology, vol. 30, Issue 4, Apr. 3, 2020, pp. 1173-1187.
Lin, et al., "Learning Cross-Aligned Latent Embeddings for Zero-Shot Cross-Modal Retrieval", In Proceedings of the AAAI Conference on Artificial Intelligence, vol. 34, Issue 7, Feb. 7, 2020, pp. 11515-11522.
"International Search Report and Written Opinion Issued in PCT Application No. PCT/US23/011566", Mailed Date: May 25, 2023, 10 Pages.
U.S. Appl. No. 17/538,880, filed Nov. 30, 2021.
"Non Final Office Action Issued in U.S. Appl. No. 17/538,880", Mailed Date: Jun. 13, 2023, 15 Pages.
U.S. Appl. No. 18/158,121, filed Jan. 23, 2023.
U.S. Appl. No. 17/703,552, filed Mar. 24, 2022.
Final Office Action mailed on Nov. 9, 2023, in U.S. Appl. No. 17/538,880, 13 pages.
Notice of Allowance mailed on Mar. 18, 2024, in U.S. Appl. No. 17/538,880, 10 pages.
Non-Final Office Action mailed on Jul. 24, 2024, in U.S. Appl. No. 18/158,121, 74 pages.
Non-Final Office Action mailed on Jul. 30, 2024, in U.S. Appl. No. 17/703,552, 60 pages.
Notice of Allowance mailed on Jan. 10, 2025, in U.S. Appl. No. 17/703,552, 11 pages.

* cited by examiner

METHOD AND SYSTEM OF RETRIEVING ASSETS FROM PERSONALIZED ASSET LIBRARIES

BACKGROUND

It is common for users of digital devices to search for digital content for a variety of reasons. For example, users may search for content that they can use in creating their own documents. This may include searching for visual contents such as images, videos, GIFs, icons, illustrations, multimodal content (e.g., templates or other documents containing multiple types of content) and the like. To provide useful search results, applications that enable content retrieval often utilize a large library of digital contents as assets that are available for retrieval. The digital contents are often collected and/or purchased from various sources. While content retrieval applications may have access to large libraries of digital contents, and as such may include contents that are related to many different topics and fields, they often provide generalized search results that may not be useful to some enterprise users and/or consumers who have specific needs.

Adding new content to the library of digital contents, however, often requires extensive human intervention. For example, adding new content may require manually annotating the new data. This process is often time consuming and expensive. As a result, most enterprise and/or consumer users have to rely on a generalized available library of contents for their digital content needs. Moreover, the machine-learning (ML) models trained for asset indexing and digital content retrieval are often too large to deploy and operate. For example, such trained ML models may require significant memory space to store and operate.

Hence, there is a need for improved systems and methods of retrieving digital content from personalized asset libraries.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a search query for searching for one or more assets in one or more asset libraries, the one or more asset libraries including a personalized content library; encoding the search query into one or more query embedding representations via a trained query representation ML model; comparing, via a matching unit, the one or more query embedding representations to a plurality of asset representations, each of the plurality of asset representations being a representation of one of the plurality of candidate assets; identifying, based on the comparison, at least one of the plurality of the candidate assets as a search result for the search query; and providing the at least one of the plurality of the candidate assets for display as the search result. The plurality of asset representations for the one or more assets in the personalized content library are generated automatically without human labeling.

In yet another general aspect, the instant disclosure presents a method for retrieving one or more assets from a personalized asset library. In some implementations, the method includes receiving a search query for searching for one or more assets in one or more asset libraries, the one or more asset libraries including a personalized content library; encoding the search query into one or more query embedding representations via a trained query representation ML model; comparing, via a matching unit, the one or more query embedding representations to a plurality of asset representations, each of the plurality of asset representations being a representation of one of the plurality of candidate assets; identifying, based on the comparison, at least one of the plurality of the candidate assets as a search result for the search query; and providing the at least one of the plurality of the candidate assets for display as the search result. The plurality of asset representations for the one or more assets in the personalized content library are generated automatically without human labeling.

In a further general aspect, the instant application describes a non-transitory computer readable medium on which are stored instructions that when executed cause a programmable device to perform function of receiving a search query for searching for one or more assets in one or more asset libraries, the one or more asset libraries including a personalized content library; encoding the search query into one or more query embedding representations via a trained query representation ML model; comparing, via a matching unit, the one or more query embedding representations to a plurality of asset representations, each of the plurality of asset representations being a representation of one of the plurality of candidate assets; identifying, based on the comparison, at least one of the plurality of the candidate assets as a search result for the search query; and providing the at least one of the plurality of the candidate assets for display as the search result. The plurality of asset representations for the one or more assets in the personalized content library are generated automatically without human labeling.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
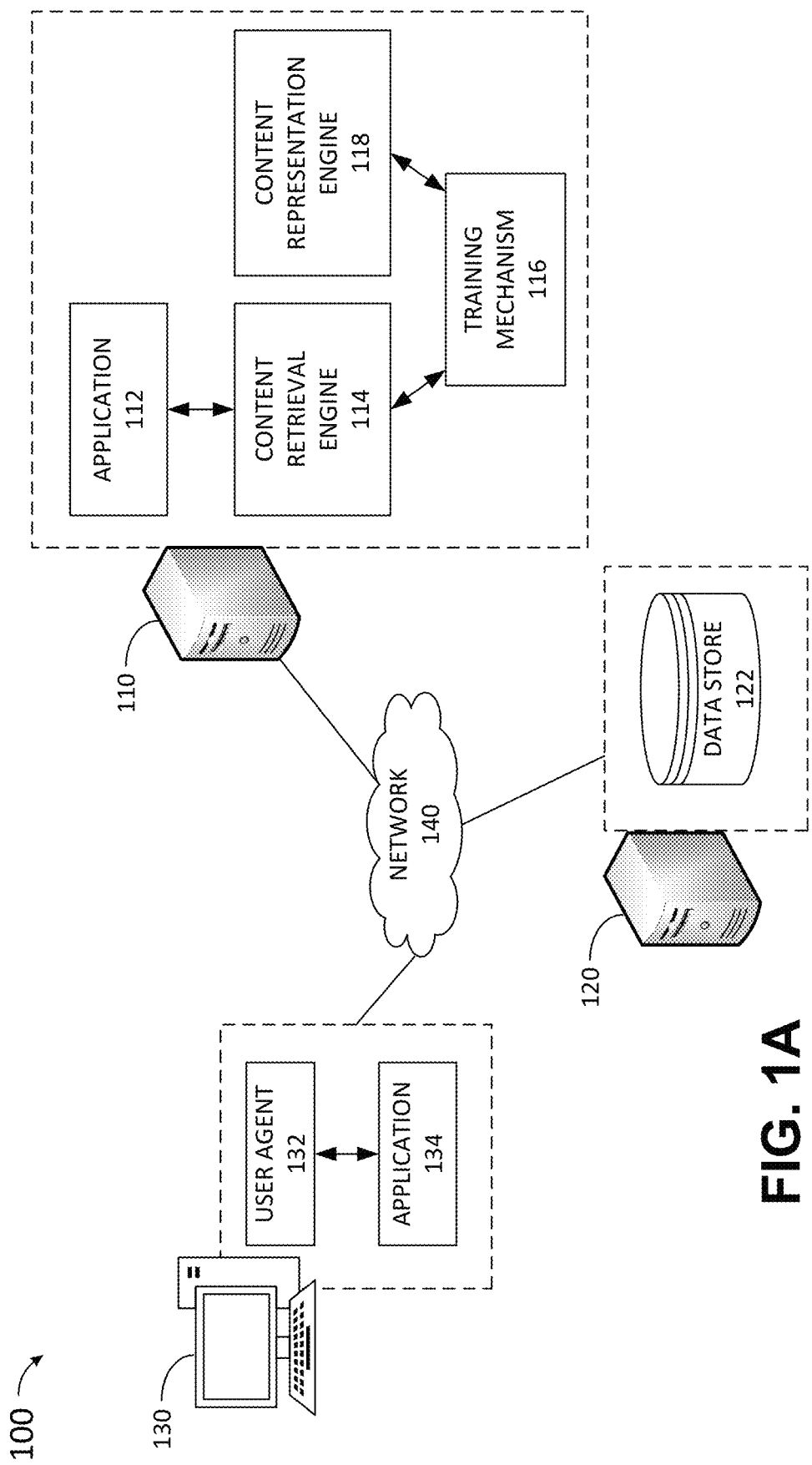
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Many currently used software applications enable users to search for content and/offer content recommendations to users in order to assist the users create a document and/or improve the quality of a document they are working on. To make the document more aesthetically pleasing or interesting, the user may choose to add visual content to the document. Some applications enable a user to use templates to create a desired document. For example, some documents such as flyers, invitations and the like may be developed by using pre-made templates. In other examples, pre-made design template may be used as examples to guide a user on how to create/design a document. A template may include many different types of content. For example, a template for a birthday invitation card often includes text, as well as images, Graphical Interchange Formats (GIFs), icons, and illustrations. Other templates may include videos, emoticons, vector graphics, and/or any combination of these contents.

To provide content to users, content retrieval systems often make use of large content libraries. These content libraries often contain a large number of one or more types of digital content (e.g., images, icons, GIFs, illustrations, templates, etc.) that has been generated, collected, and/or purchased for use. To ensure a system that is responsive to many different types of user needs, these libraries often contain content that covers a broad ranges of subjects. This results in significantly large libraries that take up a lot of memory space to store and may result in additional computing requirements to search. Furthermore, these large libraries may still not be responsive to various users' needs, as the content offered by such libraries is often global and as such generic for large populations. Certain enterprises and consumers, however, may have specific requirements. For example, an enterprise may have specific formatting/design requirements for their design or presentation documents. In another example, enterprise users of an auto manufacturing company may need images, illustrations and GIFs that display the cars manufactured by the company. Searching for images of cars using a content retrieval system that relies on a global content library, however, will provide search results of generic cars. Such search results may not be useful to the users of the auto manufacturing company. Thus, there exists a technical problem of current content retrieval systems relying on extensively large content libraries that take up a lot of memory and computing resources to store and process and yet provide results that are generic and thus may not be relevant to users' needs.

Furthermore, to add new content (e.g., images, icons, emoticon, videos, templates, etc.) to the content libraries, currently used content retrieval mechanisms often require that the new content be labeled before it can be added to the content databases for searching. The labeling requirement is often extensive. For example, multiple keywords need to be assigned to each new icon. This requires significant cost and labor. Moreover, after new content is added, because of lack of user feedback for the new content, the models often struggle to recommend them as search results. This often means that it takes a significant amount of time to improve search quality for new content. Thus, there exists another technical problem of lack of mechanisms for efficiently adding new content to content libraries and providing the new content as search results.

To address these technical problems and more, in an example, this description provides technical solutions for intelligently providing enterprise, consumer and/or global content retrieval and recommendation for users by utilizing a content retrieval architecture that supports a variety of content types. This may be achieved by utilizing a content retrieval engine that enables searching for and retrieving content from a combination of enterprise, consumer and/or global content libraries, based on the user's needs and requirements. The content types may include multimodal content such as pre-designed templates as well as other types of visual assets such as images, icons, illustrations and the like. This may involve use of a framework that eliminates the need for model retraining and/or human annotation to incorporate new content. The framework may rely on shared computational steps to obtain embeddings for new content. This provides a mechanism for adding new content to asset libraries in a zero-shot manner that does not require labeling and can be performed quickly and efficiently. The content retrieval architecture and zero-shot mechanism enables enterprises and/or consumers to quickly and efficiently add their own content to content libraries for searching and retrieval. This provides a level of personalization that goes beyond current personalization mechanisms that utilize user feedback in identifying more relevant search results. By utilizing a user's (e.g., consumer or enterprise) own content, the content retrieval architecture of the technical solution can provide content recommendations that are much more likely to be relevant to the user's needs.

Searching via the content retrieval system may be provided by one or more applications that offer searching via text and/or other types of queries. For example, search queries may include providing one or more types of input content as query. The input content may be an image, an icon, a text, an illustration, a template, or any combination of these types of inputs. The search features may be provided via a user interface (UI) screen that enables the user to perform a search and view search results and/or provides content recommendations for inserting into or utilizing in creation of a document. In an example, the user can select one or more types of content libraries (e.g., personal, enterprise, global, and the like) to retrieve content from. The architecture may enable personalized search and retrieval using a combination of server-side and client-side mixing and re-ranking of search results that increases efficiency in processing searching and content retrieval. In this manner, the technical solution provides a searching and retrieval system that can easily and efficiently add personalized new content to content libraries, search for content in an efficient and accurate manner in a variety of content libraries, and is user friendly and provides highly relevant results.

The technical solution described herein addresses the technical problem of inadequate, inefficient and/or inaccurate mechanisms for searching for content and achieves technical effects by providing a system and method for intelligently adding personalized content to content libraries, and locating and retrieving assets from one or more asset libraries, as needed. The technical solution allows a user to quickly and efficiently search for, access and review search results from one or more content libraries, and therefore improves graphical user interfaces for electronic devices. The technical effects at least include (1) improving the efficiency and accuracy of using an electronic device to add new content to content libraries by providing a mechanism for adding new content in a zero-shot manner that does not require labeling and can be performed quickly and efficiently; (2) improving the efficiency of searching for content in asset libraries containing a significantly large number of assets; and (3) increasing relevancy of search results displayed to the user by using personalized content libraries.

As will be understood by persons of skill in the art upon reading this disclosure, benefits and advantages provided by such implementations can include, but are not limited to, a technical solution to the technical problems of lack of mechanisms for efficient and user-friendly searching for personalized content. Technical solutions and implementations provided herein offer a mechanism for adding new and personalized content to content libraries in a zero-shot manner that is quick, efficient and accurate. The benefits made available by these technology-based solutions provide a user-friendly mechanism for searching for different types of contents in one or more content libraries, reduced memory, processing and bandwidth requirements for storing and running the searching systems and reduced costs associated with updating the content libraries and search models.

As used herein, the terms "multimodal content," "multimodal document" or "multimodal asset" may refer to an electronic document that includes different types of content. The different types of content include texts, images, videos, GIFs, icons, emoticons, vector graphics, illustrations and the like. The term "content" or "asset" as used herein may refer to any type of electronic document that can be provided as a retrievable asset from a library. Examples of contents include images, videos, GIFs, icons, emoticons, vector graphics, illustrations and multimodal content. Moreover, the term "content library" may refer to a data set for storing retrievable content. Furthermore, as used herein, the term "textual input" may refer to an input received via an input/output device of a computer device, where the input includes alphanumeric text or other characters. The term "search query" may refer to input data provided as a sample of a type of data for which a search should be conducted. The input data may include text, images, multimodal content, icons, videos, illustrations and the like.

FIG. 1A illustrates an example system 100, upon which aspects of this disclosure may be implemented. The system 100 may include a server 110, which may itself include an application 112, a content retrieval engine 114, a content representation engine 118, and a training mechanism 116. While shown as one server, the server 110 may represent a plurality of servers that work together to deliver the functions and services provided by each engine or application included in the server 110. The server 110 may operate as a shared resource server located at an enterprise accessible by various computer client devices such as a client device 130. The server 110 may also operate as a cloud-based server for offering content retrieval services in one or more applications such as application 112 and/or application 134.

The server 110 may include and/or execute a content retrieval engine 114, which may receive a request for content from an application such as the application 112 or 134 and may process the request by identifying one or more assets that correspond with the request. The request may be an explicit search request submitted by a user via a UI associated with the application 112 or 134. Alternatively, the request may be transmitted automatically via the application 112 or 134 to provide automatic content recommendations to the user. For example, the application 112 or 134 may examine the content of a document a user is interacting with, determine based on the actions of the user and/or other parameters that the user is creating content, identify keywords, formatting and/or other features of the content, and create a search query for content based on some of the content of the document and/or contextual data. This may be done by utilizing one or more ML models that perform natural language processing (NLP) and/or other functions to automatically create one or more search queries for a document and/or user. The search query may include textual input such as text keywords and/or other types of input. For example, the query may include one or more type of data from the document the user is working (e.g., image, icon, illustration, etc.).

The content retrieval engine 114 may include separate modules for processing the different types of queries. For example, the content retrieval engine 114 may include different modules from processing text queries, image queries, icon queries, and the like. Furthermore, the content retrieval engine 114 may include a separate element for comparing the processed query data with processed assets to identify one or more assets that correspond with the query. One or more modules and elements of the content retrieval engine 114 may include one or more ML models. The internal structure of and data flow between the various elements of the content retrieval engine 114 is discussed in greater detail with respect to FIG. 1C.

One or more ML models implemented by the content retrieval engine 114 and/or asset representation engine 118 may be trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. In other implementations, the training mechanism 116 uses unlabeled training data. The initial training may be performed in an offline stage. Additionally, and/or alternatively, the one or more ML models may be trained using batch learning.

As a general matter, the methods and systems described herein may include, or otherwise make use of one or more ML model to perform NLP, vectorize different types of data, analyze content and/or locate search results. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in different types of assets, determine associations between various words and objects, identify keywords and/or classify content. Such training may be made following the accumulation, review, and/or analysis of data. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The content representation engine 118 may operate to convert one or more contents into numerical dense vector embeddings. In an example, the content representation engine 118 can convert different types of contents including multimodal assets to vector embeddings. To achieve this, the content representation engine 118 may make use of separate ML models for each type of content. For example, the content representation engine 118 may include an ML model for converting images to vector representations, another ML for converting icons to vector representations, yet another ML model for converting illustrations to vector representations. The content representation engine 118 may be used to convert specific sets of content into vector embeddings. For example, the content representation engine 118 may be used in a zero-shot manner to convert a content data set provided by an enterprise to vector representations. Similarly, the content representation engine 118 may be used to convert a user's personal content (e.g., images) into vector representations. Further details regarding the operation of the content representation engine is provided in greater detail with respect to FIG. 1B.

The system 100 may include a server 120 which may be connected to or include the data store 122 which may function as a repository in which databases relating to training models, content libraries, and/or vectorized representations of contents may be stored. Although shown as a single data store, the data store 122 may be representative of multiple storage devices and data stores which may be accessible by one or more of the content retrieval engine 114, content representation engine 118, training mechanism 116, and application 112.

The client device 130 may be connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., application 112 or application 134). Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail with respect to FIGS. 7 and 8.

The client device 130 may include a local application 134. The application 134 may be a computer program executed on the client device that configures the device to be responsive to user input to allow a user to interactively create, edit, and/or review a document. The application 134 may also enable the user to interactively submit a search query and receive search results and/or content recommendations. Examples of suitable applications include, but are not limited to, a word processing application, a presentation application, a note taking application, and communications application, and a design application. The application 134 may also be representative of an application used to submit a request for adding one or more assets to content libraries for searching. For example, the application 134 may be used to submit a request for including content of a file folder in content retrieval and search results. The application 134 may enable a user to select one or more assets (e.g., files) and then to submit a request for adding those assets to content libraries or creating a new personalized content library. In some implementations, assets are automatically added to content libraries. For example, a user may have consented to or have submitted a request to add a new image added to one or more file folders on the client device 130 to a content library.

In some examples, the application used to submit a search query, receive content recommendations, and/or add content to a content library is executed on the server 110 (e.g., application 112) and provided via an online service. In some implementations, web applications communicate via the network 140 with a user agent 132, such as a browser, executing on the client device 130. The user agent 132 may provide a UI that allows the user to interact with the application 112. User data from the application 134 or application 112 may be provided via the network 140 to the content retrieval engine 114 for use in providing multimodal asset search results.

In some implementations, the client device 130 may include a local content retrieval engine and/or content library for performing offline content retrieval. The local content retrieval engine may be a lite (e.g., simplified) version of the content retrieval engine 114 that enables quick searching and retrieval of client specific content. In an example, the local content retrieval engine retrieves a list of search results from client specific content libraries, receives a list of search results from global content libraries from the content retrieval engine 114, and performs light-weighted calculations to rank, mix and re-rank the search results to get a final list of search results that includes a combination of user specific content and global content.

Figure 1B:
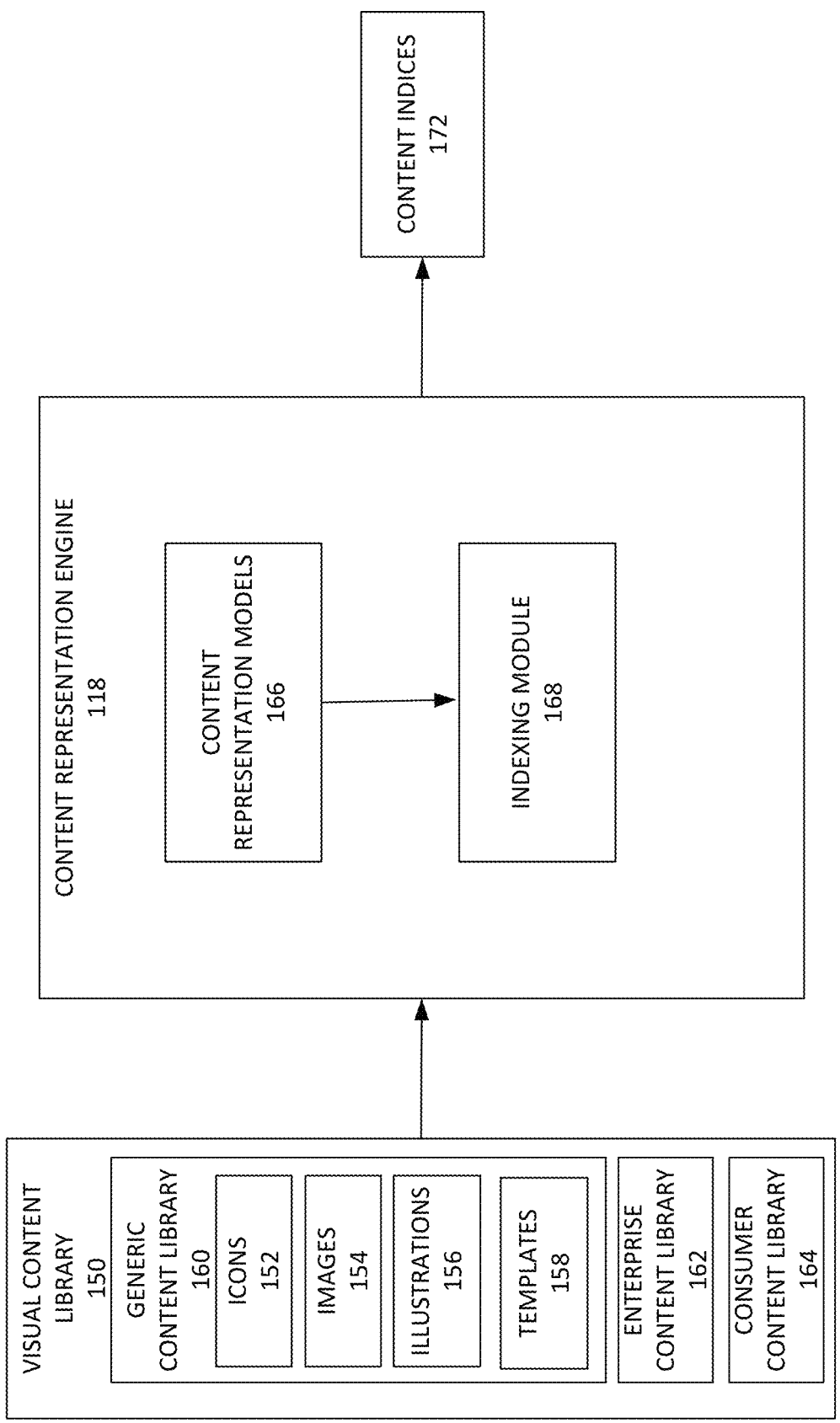
FIG. 1B depicts an example of some elements involved in generating content representations.

FIG. 1B depicts an example of some of the elements involved in generating content representations. Content in one or more content libraries may be supplied to the content representation engine 118 such that they can be converted to asset indices for efficient searching. The visual content library 150 is representative of different types of content that can be converted to asset indices for search and retrieval. The visual content library 150 may include a global content library 160, an enterprise content library 162, and a consumer content library 164. The global content library 160 may include content that has been collected, generated and/or purchased by a content retrieval service for inclusion in a content library that provides content retrieval to a variety of clients (e.g., various enterprise and/or consumer clients). The content of the global content library may relate to numerous different topics and may include various type of content.

Enterprise content library 162 may contain content provided by an enterprise for inclusion in a content library. The assets of the enterprise content library 162 may relate to topics/subjects that are of interest to the enterprise and/or that comply with the enterprise's specific needs and/or requirements. For example, the enterprise content library 162 may include templates that comply with the enterprise's formatting guidelines. The consumer content library 164 may include content provided by an individual user for inclusion in a content library. For example, a user having a large number of images may desire to use their own images in creating flyers. As a result, the user may be interested in retrieving their own image in search results. To achieve this the user may submit a request for including their images in a content library. The images may then be stored in a consumer content library 164 and provided to the content representation engine 118 for conversion to indices.

The assets provided by the visual content library 150 may be stored in a storage medium such as the storage server 120 of FIG. 1A (e.g., in data store 122). Alternatively, different portions of the visual content library 150 may be stored in different storage mediums. For example, the enterprise content library 162 and/or consumer content library 164 may be stored in an enterprise storage medium and/or on a client device.

The visual content library 150 may include a vast library of visual assets (e.g., millions or thousands of visual assets), which may include many different types of visual assets. In an example, the global content library 160 includes an icons library 152, an images library 154, an illustrations library 156, and a templates library 158. Many other types of visual assets may be included in the visual asset library 150 (e.g., GIFs, illustrations, emoticons, etc.). Each of the icons' library 152, images' library 154, illustrations' library 156, and templates' library 158 may include a large number of assets. The templates library 158 may include multimodal assets (e.g., templates) that each contain one or more different types of content (e.g., text, image, icons, illustrations, etc.). Each of the enterprise content library 162 and consumer content library 164 may also include different types of visual assets such as icons, images, illustrations, and templates.

The content representation engine 118 may include various elements for processing each assets in the visual content library 150. For converting multimodal content such as templates 158, the content representation engine 118 may include various elements for generating multimodal tensors, as discussed in detail in U.S. patent application Ser. No. 17/703,552, entitled "Method and System of Retrieving Multimodal assets," the entirety of which is incorporated herein by reference. The content representation engine 118 may also include content representation models 166 for converting the content to vector representations. The content representation models 166 may be trained representation models for converting different types of content into vector representations. In an example, the content representation models 166 include a text representation model, an image representation model, an icon representation model and an illustration representation model. Many other different type of representation models may also be included to convert other types of content (e.g., videos, emoticons, GIFs, etc.) to vector representations.

The content representation models 166 may process content of each of the asset libraries to convert the content to embedding vectors which may then be stored in a matrix/tensor format to facilitate matching and selection at runtime. In an example, the image representation model, icon representation model and/or illustration representation models of the content representation model 166 are Shifted Window (SWIN) Transformers. As is known in the art, a SWIN transformer is a type of vision transformer that builds hierarchical feature maps by merging image patches in deeper layers. These models may convert the visual content of multimodal assets (e.g., visual content of templates 158) and/or visual assets (e.g., icons 152, images 154 and illustrations 158) to a multi-dimensional vector space (e.g., 256 dimensions) in the same vector space. The vector space may have the same number of dimensions as the vector space into which the search query is converted. Thus, each visual asset in the visual asset library 150 may be encoded into one or more vector embeddings.

Once the content of the templates 158 and/or icons 152, images 154 and illustrations 158 are converted to vector representations, they may be provided to an indexing module 168 for generating content indices 172 for each content. The indexing module 170 may be an Approximate Nearest Neighbor (ANN) indexing module that utilizes ANN indexing techniques to index the embeddings generated by the content representation models 166 and convert them to pre-computed content indices 172. The content indices 172 may be transmitted to one or more content index libraries for storage. In some implementations, enterprise content indices are sent back to the enterprise for local storage at one or more storage mediums of the enterprise. Similarly, consumer content indices may be sent back to the consumer's client device for local storage.

In some implementations, the process of converting an asset to a vector embedding occurs once. Thus, when the content representation models 166 are trained, the content representation engine 118 may process the visual content library 150 to convert the contents to asset indices 172. This process may not need to be repeated in the future unless new content is added to the visual content library 150 or new content libraries are added to the system. When new content and/or a new library is added to the visual content library 150 or is provided for conversion, the new content is processed in a zero-shot manner. This means that any new content (e.g., new templates, images, icons, videos, etc.) can be directly converted into encodings by applying the content representation models 166. The process does not require labeling of the content and/or retraining the models. The content representation models 166 are trained to convert new content to encoding representations that can be easily used in a search.

Once the new content is converted, the new encodings may be transmitted to the indexing model 170 to generate content indices 172. Thus, adding new content to the existing libraries and/or adding a completely new library of content such as the enterprise content library 162 or consumer content library 164 does not require expensive labeling of content. Furthermore, there is no need for updating, changing, or retraining the content representation models 166, when new content is added. Still further, the process of adding new content is an inexpensive computational operation which can occur offline. By using the content representation models 166 to convert new content into vector encodings, the visual content library 150 can be easily scaled to millions of assets effortlessly since no human effort is involved. Furthermore, the visual content library 150 can be easily supplemented with content that is more relevant/useful to certain users, thus providing a high level of personalization at a low cost. As such, by utilizing the content representation models 166, the technical solution provides a mechanism for content retrieval systems to provide personalized search results and thus significantly improve the quality of search results and user satisfaction.

Figure 1C:
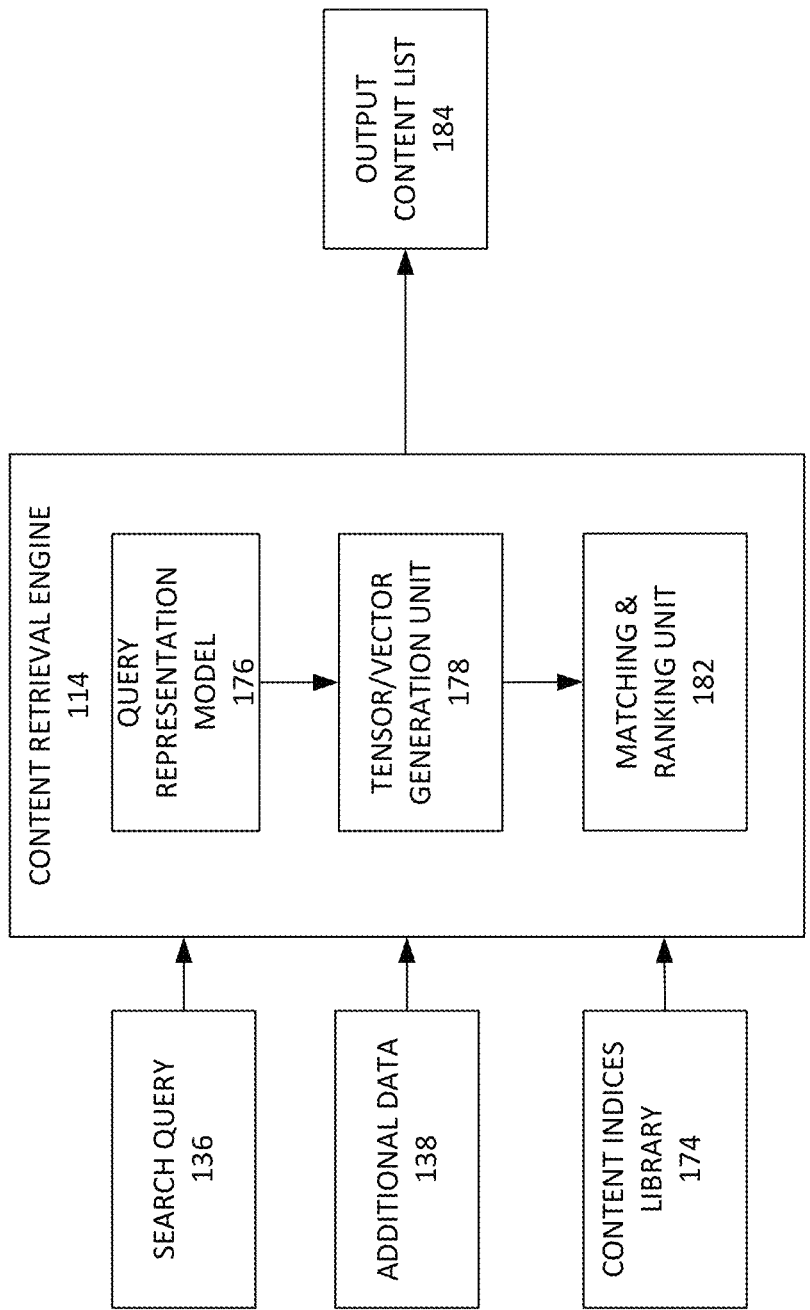
FIG. 1C depicts an example data flow between some elements of an example system upon which aspects of this disclosure may be implemented.

FIG. 1C depicts an example of data flow between some of the elements of the system 100. The content retrieval engine 114 may include a query representation unit 176, tensor/matrix representation unit 178, tensor/matrix summarization module 180 and matching and selection unit 182. Once all existing and new content or libraries are converted to representations, a user may submit a search query 136 to conduct a search for a desired content within the libraries. The search query 136 may be received via an application that provides functionality for searching for and retrieving assets such as multimodal assets. The search query 136 may be submitted by a user (e.g., explicit search request) or it may be generated by the application (e.g., implicit search request). Furthermore, the search query 136 may include text that specifies parameters for the desired assets. For example, the search query 136 may include one or more keywords or phrases related to a topic the user is interested in (e.g., waterfalls, dogs playing, plants growing, etc.). Moreover, the search query 136 may include an example of a desired content. For example, the search query 136 may include an image, an icon, an illustration, and/or a multimodal document (e.g., a template). The submitted image, icon, illustration, template and the like may provide the search parameters for receiving similar content. In another example, the user may be working on an incomplete template and decide to review similar templates. The content retrieval engine 114 enables such a user to submit the incomplete template as the search query. The incomplete template may be a multimodal document containing different types of content (e.g., text, images, icons, etc.).

In some implementations, the search query 136 also includes the type of content the user is interested in. In an example, the search query 136 includes the phrase "videos of erupting volcanoes" or "templates for birthday invitations". To ensure such search queries are processed accurately, the application via which the search query 136 is submitted may preprocess the search query 136 by determining if the search query 136 contains keywords that indicate the search query includes a request for specific types of visual assets. In some implementations, preprocessing the search query 136 is done via one or more NLP algorithms. In some configurations, the preprocessing operations are performed by the content retrieval engine 114 or another element of the system. Once words or phrases related to the type of visual asset desired are identified, those words or phrases may be removed from the search query 136 before the search query 136 is transmitted. The request for particular types of content may then be submitted as part of the additional data 138. In some implementations, even if the search query 136 itself does not include a request for specific types of data, the application via which the request is submitted may have specific requirements or restrictions. For example, the application may only be able to process (e.g., insert) certain types of visual assets into documents. In another example, the application may have quality and/or size restrictions for assets that can be utilized by the application. In yet another example, the application may have threshold requirements with respect to the likelihood of the content being a match for the search query 136. For example, the application may specify that only content that is more likely than a predetermined threshold (e.g., above 95%) to be a match for the search query 136 should be returned. These requirements and restrictions may be included in the additional data 138 which may be transmitted from the application to the content retrieval engine 114. In some implementations, the additional data 138 is included and/or transmitted with the search query 136.

Moreover, the search query 136 may specify the type of library in which the search should be conducted. For example, when the user has provided their own images as content, an option may be provided to the user to select either personal images or global images for searching. Once a selection is made, an identification of the specific type of library selected may be transmitted with the search query 136 such that searching can be conducted within the desired library. The type of library selected may be transmitted as part of the search query 136 and/or as part of the additional data 138.

Once submitted to the content retrieval engine 114, the search query 136 may be transmitted to the query representation model 176 for processing. The query representation model 176 may be a trained ML model for encoding different parts of the search query 136 into embeddings. To enable conversion of different types of inputs (e.g., text, image, template), the query representation model 176 may include a plurality of representation models, one for each type of query. For example, the query representation model 176 may include a text representation model and one or more visual representation models for different types of visual inputs (e.g., images, icons, illustrations, templates, etc.). To enable processing of multimodal input queries such as templates, the query representation model 176 may also include a parsing unit for parsing such multimodal inputs into the different types of content that make up the multimodal document. In an example, each type of input query is converted to a multi-dimensional vector space (e.g., 256 dimensions). The query representation model 176 may encode the search query 136 in a similar manner as that of the content representation models 166 such the query representations correspond to the embedding representations of the content indices library.

Once the search query 136 is converted to vector embeddings, the embeddings may be transmitted to a tensor/matrix generation unit 178 for conversion into tensors/matrices. For multimodal input queries (e.g., templates), the tensor/vector generation unit 178 may generate a multimodal tensor containing various vector embeddings that represent the content of the template. For text or single type of input queries, the tensor/vector generation unit may convert the search query 136 to a vector embedding. In some implementations, tensor/vector generation occurs as part of generating vector representations for content and is performed by the query representation models 176.

Once one or more tensors/vectors have been generated for the search query 136, the tensors/vectors may be transmitted to a matching and ranking unit 182. The matching and selection unit may also have access to a content indices library 174 that stores content indices 172. The content indices library 174 may be stored in a storage medium such as the storage server 120 of FIG. 1A (e.g., in data store 122). Alternatively, different portions of the content indices library 174 may be stored in different storage mediums. For example, enterprise content and/or consumer content indices may be stored in separate content indices libraries. The content indices library 174 may include indices for a vast library of content (e.g., millions of visual assets), which may include many different types of content (e.g., templates, images, icons, illustrations, videos, etc.).

The matching and ranking unit 182 may compare the query representations with the content representations of the content indices library 174 and retrieve content that are similar to the query representations. In some implementations, the matching and ranking unit 182 achieves this in two steps. The first step involves leveraging scalable indexing to prune the set of candidate content representations for a given query representation. This may be achieved by utilizing ANN embedding matching techniques. The smaller candidate set may then be used to perform a higher resolution matching. In some implementations, this involves comparing every element of the query representation to each element of the candidate content representations to generate similarity scores between each element of the query and the candidate representations. This may be done by using the cosine vector similarity metric to estimate the degree of similarity between a query representation and candidate representation on a −1 (highly irrelevant) to a +1 (highly relevant) scale. For candidate representations having more than one element (e.g., multimodal content), an aggregate similarity score may then be calculated based on the similarity scores of each two elements of the tensors. The candidate representations may then be ranked according to their aggregate similarity scores. Some of the most highly ranked matches may then be selected as the search results. In some implementations, the matching and ranking unit 182 selects candidate assets whose similarity score exceeds a threshold similarity measure as the search results.

The matching and ranking unit 182 may take the additional data 138 into account when retrieving visual assets that satisfy the requirements of the additional data 138. For example, when the additional data 138 specifies only one type of asset for retrieval (e.g., templates), the matching and ranking unit 182 selects search results that are of the specified type. In another example, when the additional data 138 or the search query 136 specifies a selected content library (e.g., enterprise, consumer, or global), this requirement is taken into account in matching and ranking the search results. When multiple different content libraries are searched, the matching and ranking unit 182 may search each content library separately to find relevant content in each library. The search result may then be combined and ranked based on user's preferences. In some implementations, search results from different libraries are maintained and ranked separately. Thus, the matching and ranking unit 182 may treat the requirements set forth in the additional data 138 as tunable parameters that enable the matching and ranking unit 182 to dynamically select the underlying content index to achieve the required composition of contents in the retrieved results. As such, the matching and ranking unit 182 may be a dynamic component that adapts to the client application requirements at runtime. Once the search results are ranked and selected, contents corresponding to the identified content indices may be retrieved from the respective content indices libraries and transmitted as the output content list 184 to the application that submitted the search query 136. In some implementations, a link to the identified content is provided to the application which can in turn use the link to retrieve the identified content.

Figure 1D:
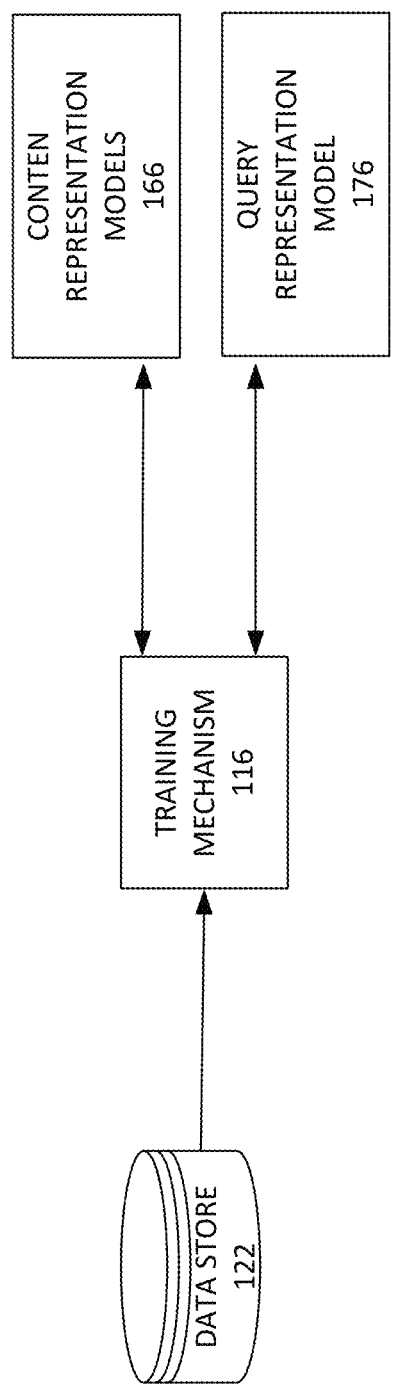
FIG. 1D depicts an example of some elements involved in training one or more ML models used by a content retrieval system.

FIG. 1D depicts how one or more ML models used by the content retrieval engine 114 and content representation engine 118 may be trained by using the training mechanism 116. The training mechanism 116 may use labeled training data sets stored in the data store 122 to provide initial training to the query representation model 176 and content representation models 166. In some implementations, a training dataset which includes pairs of candidate content and textual descriptions (e.g., one or more keywords or phrases for each type of content within the candidate content list) may be used to train the query representation model 176 and content representation model 166 in conjunction with each other. For example, for a candidate template having images, text portions, icons, and illustrations, textual descriptions may be paired with each of the images, text portions, icons, and illustrations within the template to train the models.

In some implementations, to provide ongoing training, the training mechanism 116 may use training data sets received from each of the ML models. Furthermore, data may be provided from the training mechanism 116 to the data store 122 to update one or more of the training datasets in order to provide updated and ongoing training. Additionally, the training mechanism 116 may receive training data such as knowledge from other pre-trained mechanisms. The models may be initially trained in an offline phase. Once the models are trained, ongoing training or adding of new candidate content and/or content libraries may be done in a zero-shot unsupervised manner that does not require labeling.

Figure 2:
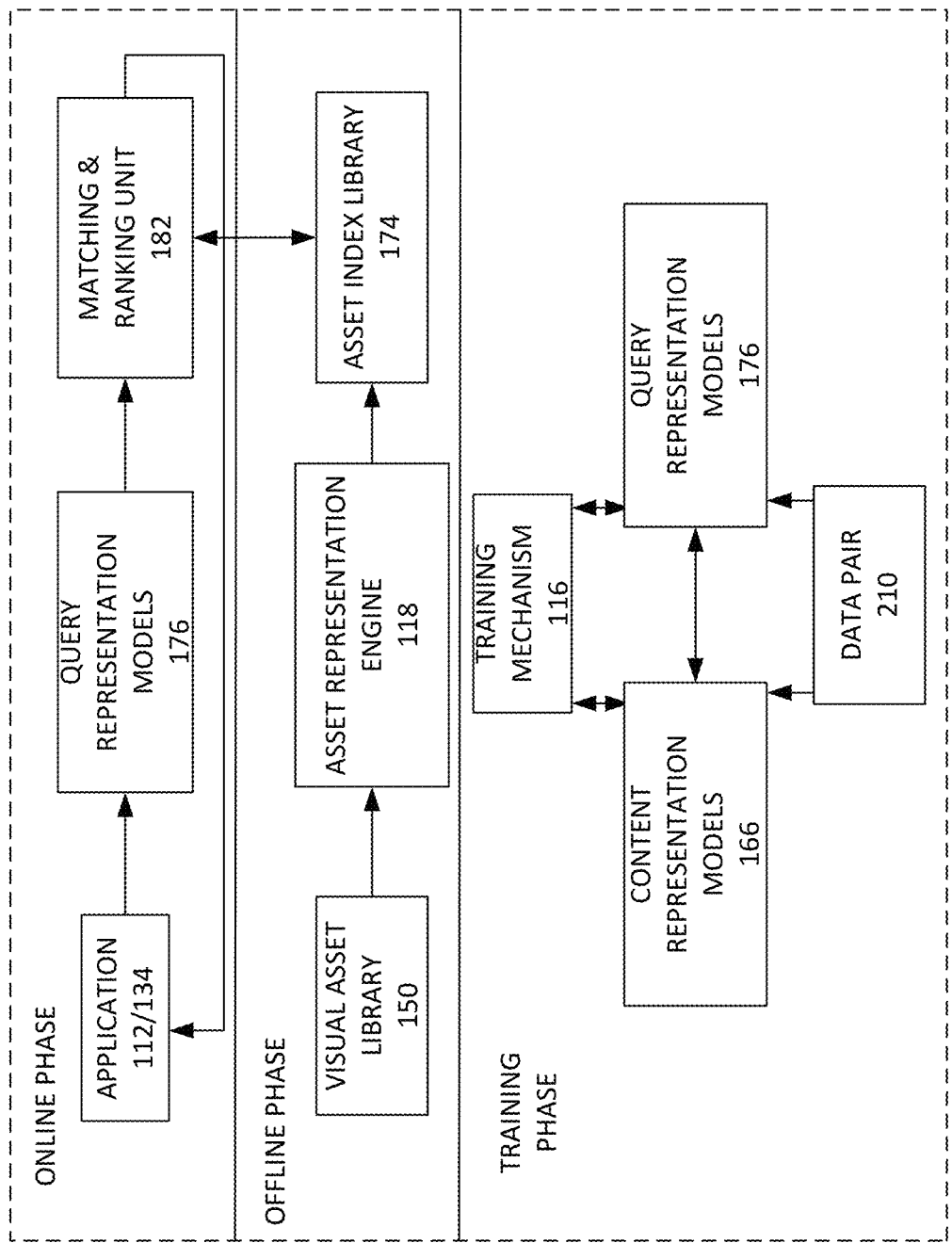
FIG. 2 depicts an example model architecture for training and utilizing a visual content retrieval system that makes use of personalized content libraries.

FIG. 2 depicts is an example model architecture 200 for training and utilizing a content retrieval system that makes use of personalized content libraries. The model architecture 200 may include three phases: a training phase, an offline phase and an online phase. The training phase may involve training each of the content representation models 166 and query representation models 176 with training data that includes data pairs 210. The data pairs 210 may include candidate assets that are aligned with text descriptions or phrases. For example, a picture of a parrot on a tree may be paired with the text "parrot in the wild." In an example, the content representation models 166 and query representation models 176 are trained in conjunction with each other with a vast number (e.g., millions) of data pairs 210. The data pairs 210 may include diverse types of candidate content to represent the content libraries that are used for retrieval of content in the online retrieval phase. This enables the content representation models 166 to identify associations between visual objects and words and/or other types of objects or assets and learn how to encode candidate assets into vector embeddings that are similar to vector embeddings generated by the query representation models 176. Thus, during the training phase, the content representation models 166 are trained to encode generic knowledge of semantic concepts, patterns and objects that commonly appear in candidate assets. Analogously, the query representation models 176 are trained to map concepts and tokens in input queries to the concepts of the content training data.

The offline phase involves use of the trained content representation models 166 of the content representation engine 118 to process each of the content libraries in a given content library to convert the constituent assets of each content library to embedding representations, which are then stored in one or more content indices libraries 174. In an example, the offline phase occurs in multiple separate phases. For example, a global content library may be converted to indices first, before enterprise and/or consumer libraries are converted. In another example, the global content library is converted first and later anytime an enterprise and/or consumer chooses to add a personalized content library, their selected library is also converted.

The online phase includes receiving a search query from an application 112/134 and using the trained query representation models 176 to encode the input query into embedding representations that are provided to the matching and ranking unit 182. The matching and ranking unit 182 may then compare the query embeddings with the asset indices generated by the content representation models 166 to identify search results in one or more content libraries. The search result are then provided to the application 112/134 for display to the user.

The modular construction of model architecture 200, both in terms of separate computation and different phases of training, indexing and online usage, provides significant advantages for operating, analyzing, maintaining, and periodically updating the underlying models. For example, the matching and ranking unit 182 may be independently updated to incorporate new client application constraints. This can occur independent of the asset representation and query representation models, thus providing an efficient mechanism for maintaining and updating the system. Furthermore, new content and/or new content libraries can be added at any time without affecting any of the elements involved in the online phase.

Figure 3:
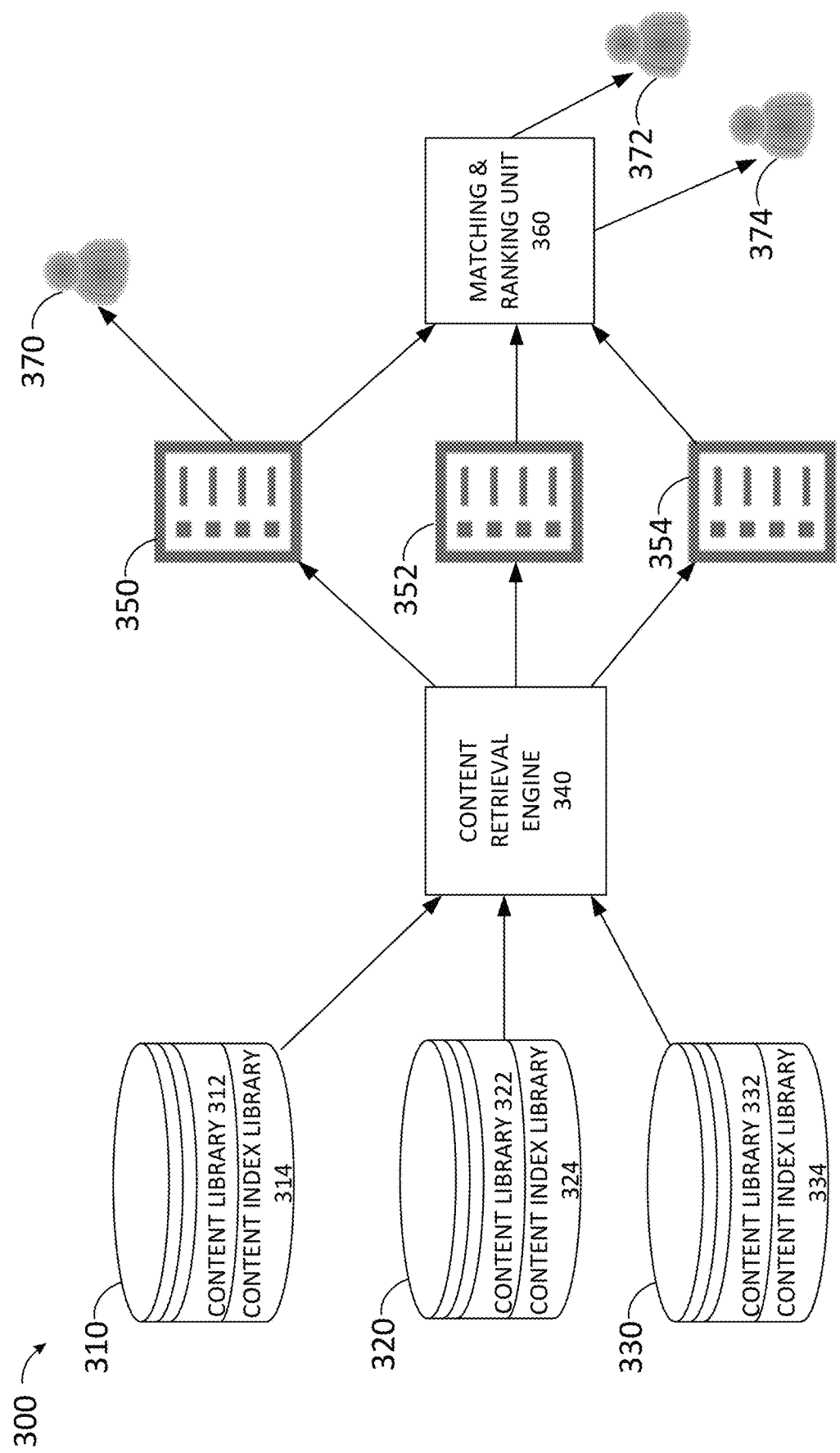
FIG. 3 depicts an example architecture for providing personalized content retrieval and recommendation.

FIG. 3 depicts an example architecture 300 for providing personalized content retrieval and recommendation. The architecture 300 includes a data store 310, a data store 320 and a data store 330, each for storing a different set of content and their associated index library. The data store 310 may store a global content library 312 containing a plurality of global content, which may be provided by a content retrieval service. The global content may include different types of content (e.g., images, icons, videos, illustrations, templates, etc.) and may be generic such that a variety of different users can use the content. The data store 310 may also store a content index library 314 which may include indices for one or more of the content in the content library 312. The indices in the content index library may be generated by a content representation model in an offline stage and stored in the data store 310 for future use.

The data store 320 may store a first enterprise content library 322 and a content index library 324. The first enterprise content library 322 may include content provided by the first enterprise. The content may be specific to the first enterprise and may include one or more types of content. The content index library 324 may store indices corresponding to the content in the content library 322. The indices in the content index library 324 may be generated by a content representation model in an offline stage. For example, upon receiving a request from a user (e.g., an administrator) of the first enterprise for including a specific set of enterprise content in content retrieval results, the specific content may be provided for conversion to indices. The content conversion may occur as a background task that gradually converts the content to indices. The generated indices may then be returned to the data store 320 for storage. In an example, the data store 320 is stored in a local storage medium of the first enterprise. This provides increased privacy and/or security by containing the assets and indices in local machines.

The data store 330 may store a second enterprise content library or a consumer content library content library 332. The second enterprise or consumer content library 332 may include content provided by a second enterprise or a consumer (e.g., an individual user). The content may be specific to the second enterprise or consumer and may include one or more types of content. For example, a consumer may need to search for content from within the consumer's image library. The consumer may submit the image library as the content library 322 to a content representation model for conversion to indices. The resulting indices may be stored in the content index library 334. The data store 330 may be stored on the consumer's client device or on a local storage medium in the second enterprise, when the content library 332 is a second enterprise content library.

When a request for content retrieval is received by the content retrieval engine 340, the content retrieval engine 340 may retrieve one or more of the content index library 314, content index library 324 and content index library 334, depending on the parameters of the search query. In an example, when the search query is received from a user within the first enterprise, the content retrieval engine 340 retrieves the content index library 314 and content index library 324. However, if the search request specifies that the search result should return results from within the enterprise, then the content retrieval engine 340 may only retrieve the content index library 324.

The content retrieval engine 340 may process the search query based on the type of users from which the query is received and/or parameters of the search request. For a global user 370 (e.g., a user who is not associated with the first or the second enterprise or the consumer), the content retrieval engine 340 may search the content index library 314 and generate a list of global search results 350. These results may be directly provided to the global user 370 for use. For a first enterprise user 372, however, the content retrieval engine 340 may search for content in the content index library 314 and content index library 324 and provide two separate search results depicted as search result 352. If the search query indicates that only the first enterprise content should be searched, however, the content retrieval engine 340 may search solely within the content index library 324.

For a consumer 374 associated with the content library 332 or a user 374 within the second enterprise, when the content library 322 represents a second enterprise content library, the content retrieval engine 340 may search for content in the content index library 314 and content index library 334 and provide two separate search results depicted as search result 354. If the search query indicates that only the content library 332 should be searched, however, the content retrieval engine 340 may search solely within the content index library 334. When two or more content libraries are searched and separate search results are generated, the matching and ranking unit 360 may be utilized to combine the separate search results. This may involve using an ML model that utilizes a history of different users/user groups' interaction with the retrieval system to rank the search results. The ML model may function as a personalizer of search results and may be trained quickly and efficiently without significant human supervision to take into account user preferences when ranking search results. The combined and/or reranked search results may be provided to the enterprise user 372 and/or consumer/enterprise user 374.

Figure 4A:
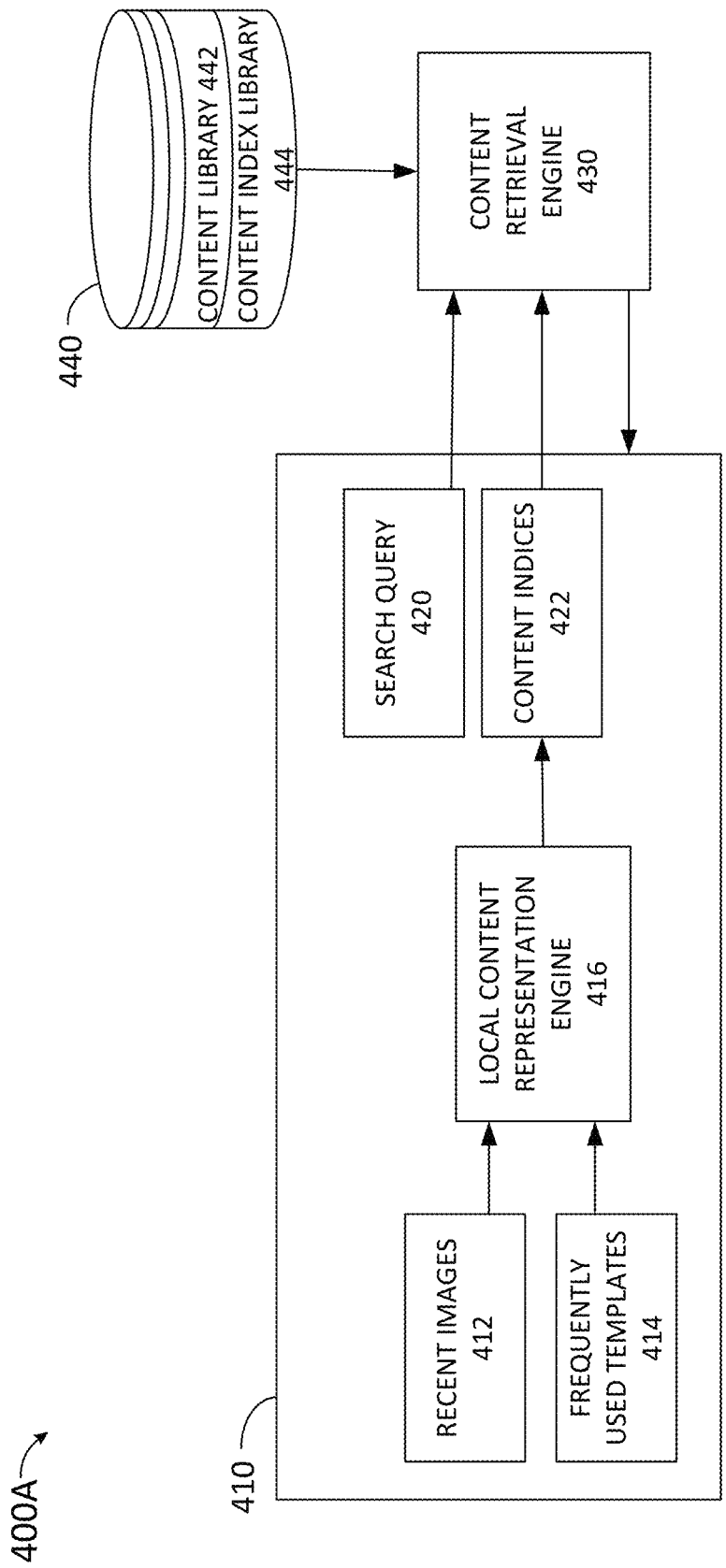
FIGS. 4A-4B depict example architectures for providing consumer level personalization in a content retrieval and recommendation system.
Figure 4B:
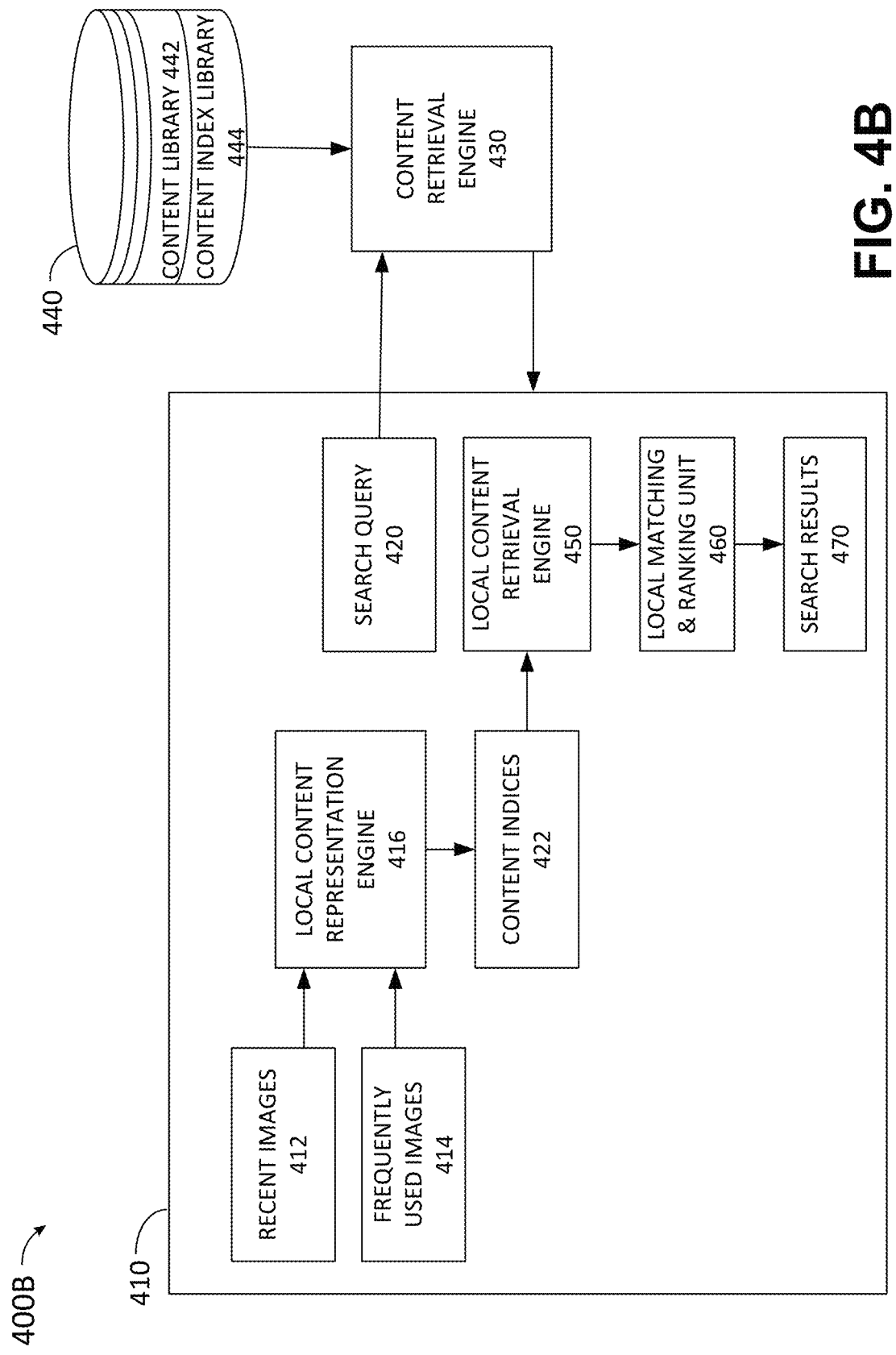

FIGS. 4A-4B depict example architectures for providing consumer level personalization in a content retrieval and recommendation system. FIG. 4A depicts an example architecture 400A for providing consumer level personalization in content retrieval. In the example of architecture 400A, the user of a client device 410 is interested in receiving content recommendations from two specific sets of content, recent images 412 and frequently used templates 414. The recent images 412 and/or frequently used templates may include content that is selected by the user as being recent or frequently used or may be identified automatically by an application. Once selected/identified, the recent images 412 and frequently used templates 414 may be supplied to a local content representation engine 416 for processing. The local content representation engine 416 may be a light-weight content representation model that is developed for processing a smaller number of content at a local level. The local content representation engine 416 may convert the recent images 412 and frequently used templates 414 to content indices 422 that are stored locally on the client device 410.

A search query 420 may then be transmitted by the user for processing. The search query may be transmitted from the client device 210 to the content retrieval engine 430 which may be stored in a server and may provide global content retrieval services. The content retrieval engine 430 may also have access to and may retrieve content from a global data store 440 which stores a global content library 422 and its corresponding global index library 444. For a search query that requests global as well as local content, the content retrieval engine 430 may retrieve both the content indices 422 and the content index library 444 for searching. Once the request is processed and content from the recent images 412, frequently used templates 414 and/or content library 442 is identified, the result may be transmitted from the content retrieval engine 430 to the client device 410 for display to the user. The identified search results may include content from the recent images 412 and frequently used images 414, if relevant. The search results from the different content libraries may be combined and/or provided in separate lists based on parameters of the search request and/or the application from which the request is submitted. Combining, ranking and reranking of the search results may be performed by the content retrieval engine 430. The content retrieval engine 430 may utilize ANN techniques for searching within the larger content index library 444 and a small library such as the content indices 422.

FIG. 4B depicts an alternative example architecture for providing consumer level personalization in content retrieval. In the architecture 400B of FIG. 4B, the user may also desire to search for content within the recent images 412 and/or frequently used images 414 and as such may submit those content libraries to the local content representation engine 416 for conversion to content indices 422. However, the client device 410 may also include a local content retrieval engine 450 for retrieval of local content. The local content retrieval engine 450 may be a light-weight version of the content retrieval engine 430 that is small enough in size such that it can be stored in the client device 410, and yet is able to conduct a search in a small content index library such as the content indices 422 and provide highly relevant results. Thus, the content indices 422 may be transmitted to the local content retrieval engine 450 for content retrieval in the recent images 412 and frequently used images 414.

The search query 420 may be transmitted to the content retrieval engine 430 for processing. The content retrieval engine 430 may convert the search query to query representations that are used by the content retrieval engine 430 and local content retrieval engine 450 for calculating similarity scores. The content retrieval engine 430 may search for content corresponding to the search query 420 in the content index library 444 and may rank the results according to a selected ranking scheme. The content retrieval engine 430 may then provide a selected number of the retrieved and ranked search results along with the query representation to client device 410.

The query representations may be provided to the local content retrieval engine 450 to enable searching of the content indices. The ranked search results, on the other hand, may be provided to the local matching and ranking unit 460. The local matching and ranking unit 460 may also receive search results from the local content retrieval engine 450. The ranked search results from the content index library 444 and the local search results may be combined and ranked by the local matching and ranking unit 460 based on user preferences. In an example, the local matching and ranking unit 460 includes an ML model trained based on feedback received from the user and/or history of use by other users such that is likely to rank the results in an order that is more likely to be relevant to the needs/preferences of the user of client device 410. One or more of the combined/ranked results may then be provided as search results 470 for display to the user.

Figure 5:
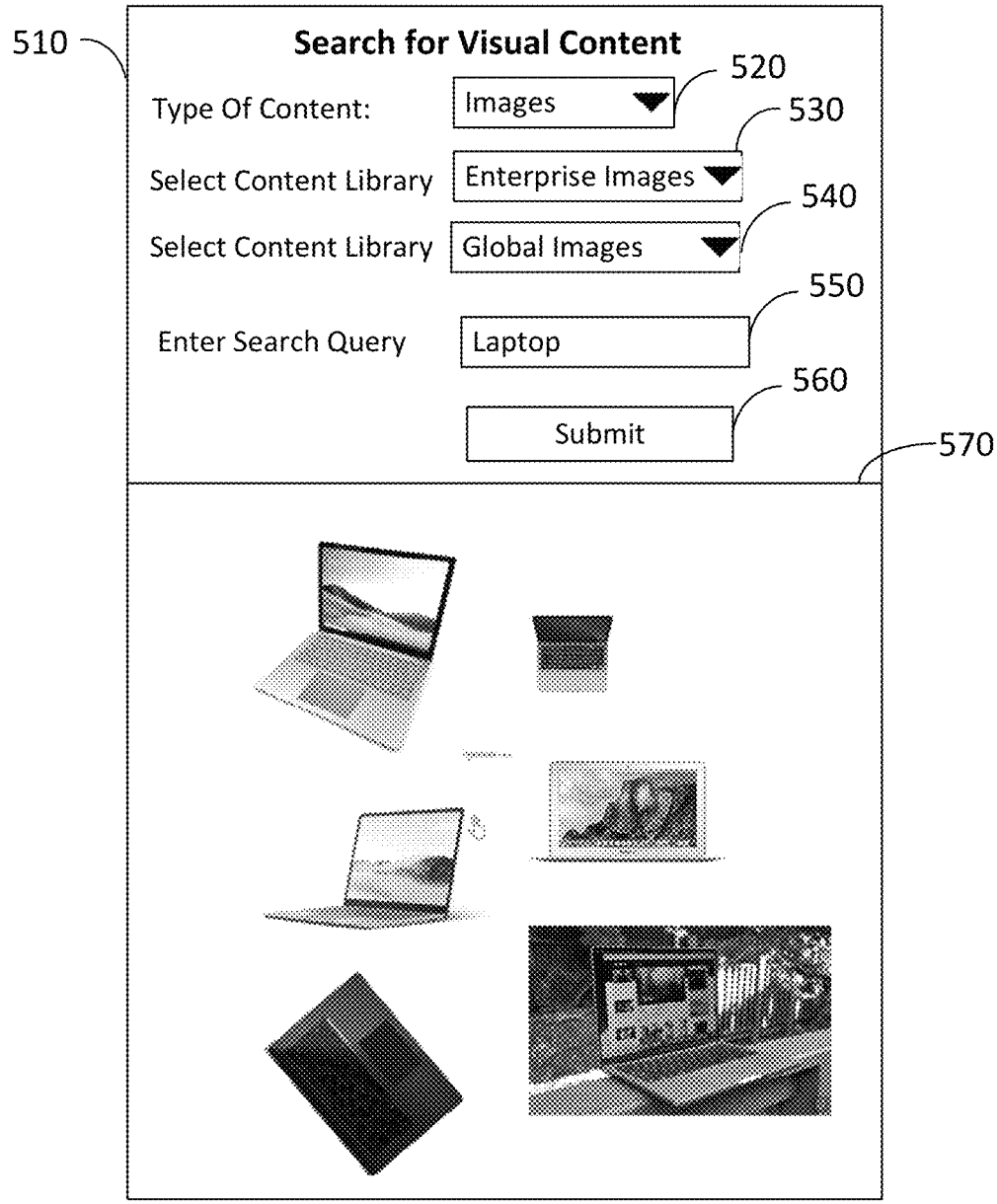
FIG. 5 depicts an example graphical user interface (GUI) screen of an application or service that provides personalized content retrieval capabilities.

FIG. 5 depict an example GUI screen 500 of an application or service that provides personalized content retrieval capabilities. GUI screen 500 displays an example screen of a designer application for designing a document (e.g., a flier, card, presentation slide, marketing material, etc.). GUI screen 500 may include a UI portion 510 containing various UI elements for personalizing a search request for content. For example, the UI portion 510 includes a dropdown menu 520 for selecting the type of content the user wishes to search for. Examples of types of content include images, icons, illustrations, GIFs, videos, templates and the like.

The UI portion 510 may also include a first dropdown menu 530 and a second dropdown menu 540 for selecting one or more content libraries in which contents should be searched for. The dropdown menus may enable selection of content libraries having content that has already been indexed. In some implementations, more content libraries may be added upon selection of additional UI elements (not shown). In other implementations, a UI element may be provided for submitting a request to add new content to a content library or a add a new content library to current content libraries.

The GUI screen 500 also includes a UI element 550 for entering a search query. The UI element 550 may function as a search input box to input a text query for conducting a search of the available content. In other examples, the UI element 550 may offer options for attaching an image, or other type of document as a search query. For example, a UI element (e.g., icon) may be displayed adjacent to or within the UI element 550 that once selected enables the user to attach a document. In some implementations, the UI element 550 allows the user to enter a text segment and attach one or more documents to submit a combination of search query inputs. Furthermore, the UI element 550 may enable the user to enter other requirements into the input box. For example, the user may enter the desired size of the search results (e.g., all sizes, large sizes, etc.).

Once the user enters a search query into the input box 550, they may utilize a UI element 560 or the enter key on a keyboard to submit the search request. The application may then utilize a local content retrieval engine and/or a global content retrieval engine to perform a search for the requested content in the selected content libraries. The search may be performed, as discussed above, and the search results may be provided to the application.

Once the results are received, the application may display the search results in a screen portion 570 of the GUI screen 500. A scroll bar (not shown) may be provided for scrolling through the search results when the results cannot be displayed in the available screen space. The search results may be displayed in an order in which they were ranked based on their similarity score and user preference history. It should be noted that while a UI element 520 is displayed in GUI Screen 500 for entering a search query and the search results are displayed in the screen portion 530, many other type of UI elements may be utilized for these purposes. For example, the search results may be displayed in a pop-menu that appears over the GUI screen 500. The user may select one or more of the displayed search results by clicking on the desired search result. Upon selection, the selected search result may be opened in a content pane for use and editing. It should be noted that while GUI screen 500 includes a search input box 560, in some implementations, search results are provided automatically as recommendations without an explicit user request.

Figure 6:
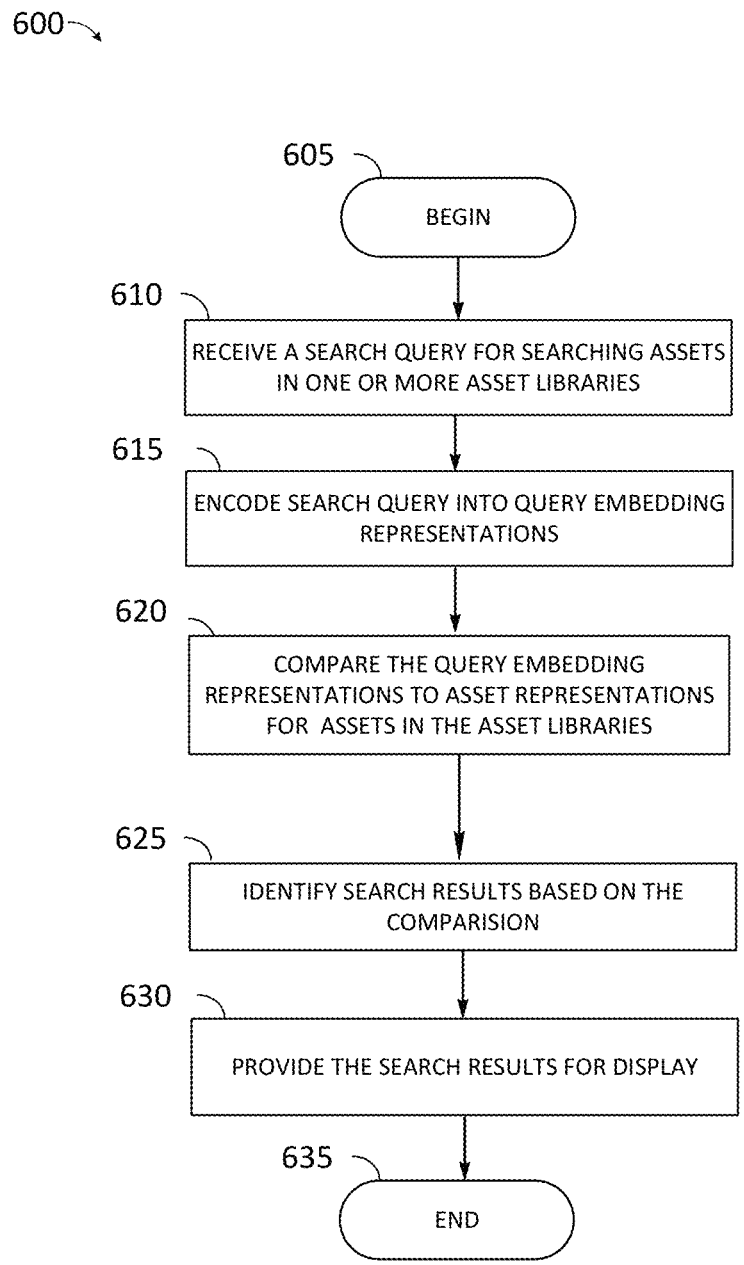
FIG. 6 is a flow diagram depicting an example method for intelligently retrieving personalized content from one or more content libraries.

FIG. 6 is a flow diagram depicting an exemplary method 600 for intelligently retrieving personalized content from one or more content libraries. One or more steps of the method 600 may be performed by a content retrieval engine such as the content retrieval engine 114 of FIGS. 1A-1B, local content retrieval engine 450 of FIG. 4B and/or by an application such as applications 112/134 of FIGS. 1A-1B. The method 600 may begin, at 605, and proceed to receive a search query for searching for assets in one or more asset libraries, where the asset libraries include one or more personalized asset libraries such as enterprise libraries and/or consumer libraries, at 610. This may occur, for example, when a user submits a search query input via a UI of an application or service that provides asset retrieval and indicates a specific content library for searching. The search query may include one or more keywords, images, templates, or other multimodal documents and may be provided via a client device. The search query may then be transmitted via a network to a content retrieval engine and/or to a local content retrieval engine when the personalized libraries include libraries having locally stored index libraries.

Once the search query is received, the data within the search query may be encoded into query embedding representations, at 615. This may be done by utilizing a trained query representation ML model that converts data into embeddings. The embeddings may then be compared to asset representations (e.g., indices) for a plurality of candidate assets of the asset libraries by a matching and ranking unit, at 620. This may involve first retrieving asset representations that have previously been generated from candidate assets in the content libraries. In some implementations, both the query embeddings and the asset representations are summarized to generate summarized tensor representations that can be used in an ANN search.

Comparing the asset representations with the asset may involve two stages. A first stage may involve calculating a similarity score for each of the assets in the asset libraries, where the similarity score calculates a level of similarity between the candidate asset and the search query. One or more of the candidate assets are then identified as search results, based on the comparison and/or ranking, at 625. In an example, candidate assets having similarity scores that are higher than a given threshold are selected as the results. The identified search results may then be provided for display to the application from which the search query was received, at 630, before method 600 ends, at 635.

Figure 7:
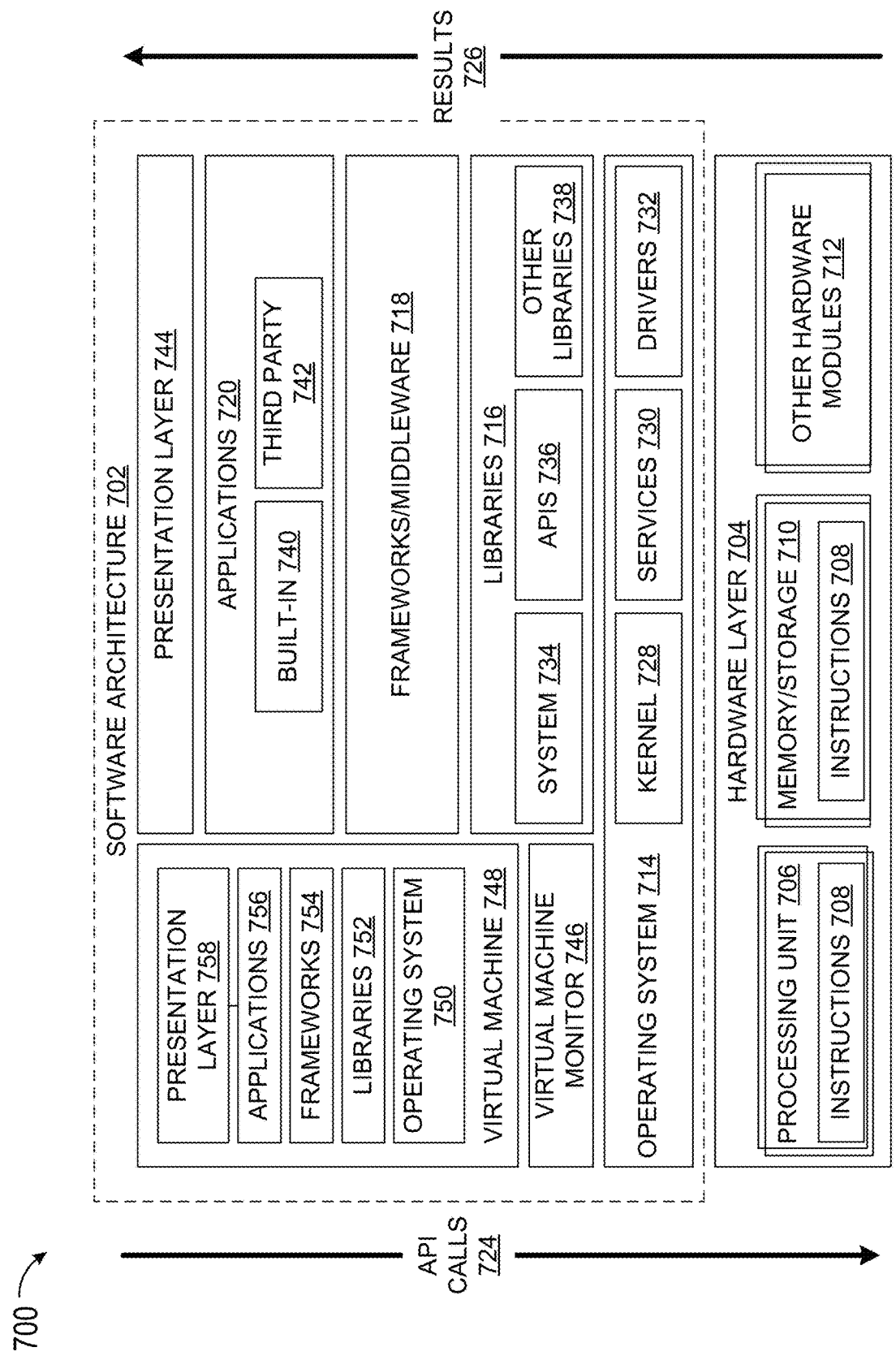
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular system. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine depicted in block diagram 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
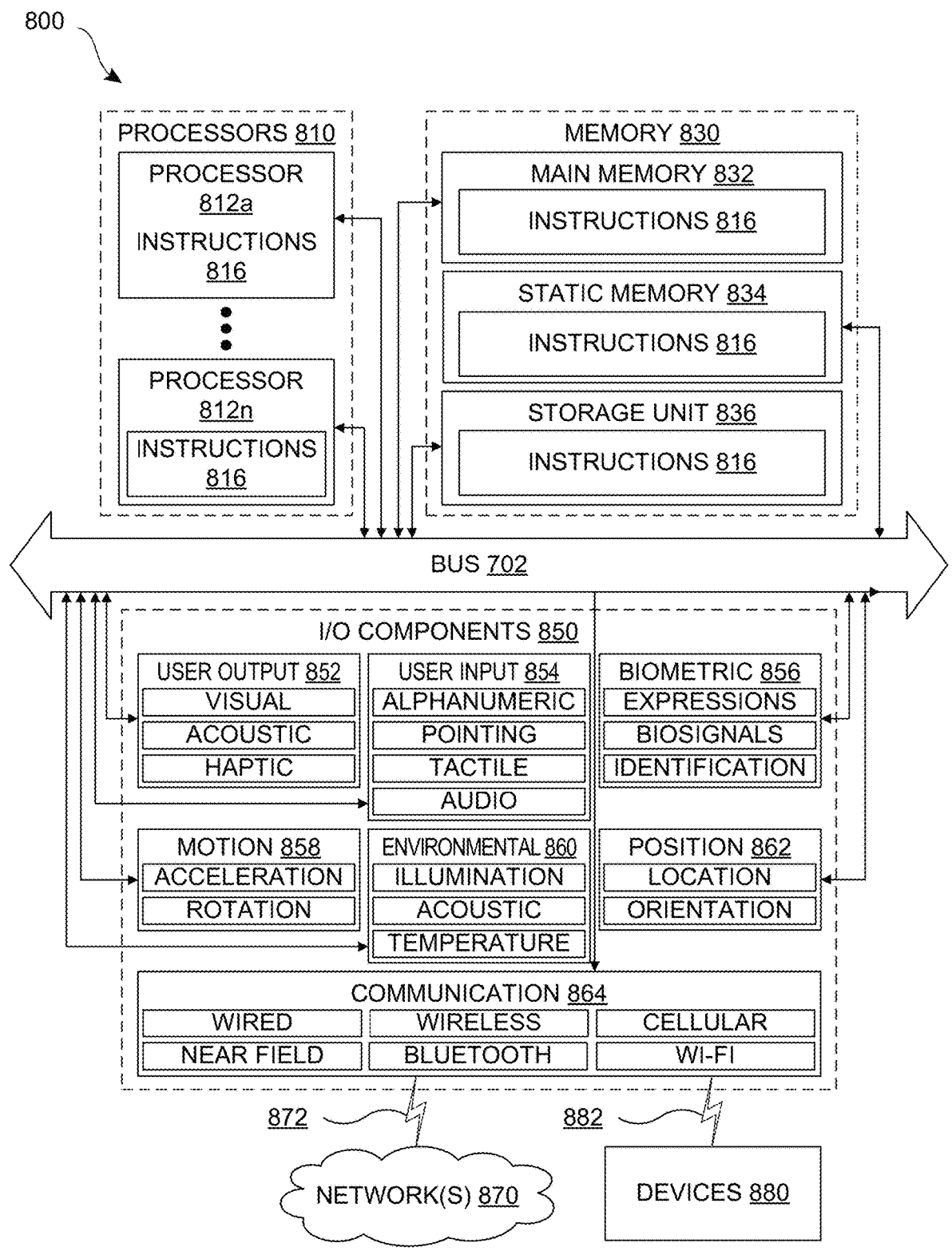
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers). The motion components 858 may include, for example, motion sensors such as acceleration and rotation sensors. The environmental components 860 may include, for example, illumination sensors, acoustic sensors and/or temperature sensors.

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a processor; and
  a memory in communication with the processor, the memory comprising executable instructions that, when executed by the processor, cause the data processing system to perform functions of:
    receiving a search query for searching for one or more assets in one or more asset libraries, the one or more asset libraries including a personalized asset library and each of the one or more asset libraries including a plurality of candidate assets;
    encoding the search query into one or more query embedding representations via a trained query representation machine-learning (ML) model;
    comparing, via a matching unit, the one or more query embedding representations to a plurality of asset representations, each of the plurality of asset representations being a representation of one of the plurality of candidate assets;
    identifying, based on the comparison, at least one of the plurality of the candidate assets as a search result for the search query; and
    providing the at least one of the plurality of the candidate assets for display as the search result,
    wherein the plurality of asset representations for the one or more assets in the personalized content library are generated automatically in a zero-shot manner.

Item 2. The data processing system of item 1, wherein the one or more asset libraries includes a global asset library and the personalized asset library.

Item 3. The data processing system of items 1 or 2, wherein the personalized asset library includes at least one of an enterprise asset library and a consumer asset library.

Item 4. The data processing system of any preceding item, wherein the personalized asset library is provided to a content representation engine for converting the plurality of candidate assets in the personalized asset library to asset indices.

Item 5. The data processing system of item 4, wherein converting the personalized asset library to asset indices occurs in an offline stage.

Item 6. The data processing system of item 4, wherein converting the personalized asset library to asset indices is done by a local content representation engine stored locally at a client device.

Item 7. The data processing system of any preceding item, wherein the request includes a selection of one asset library from among the one or more asset libraries.

Item 8. The data processing system of any preceding item, wherein:
  the request includes a selection of a global asset library and the personalized asset library, and
  the matching unit combines search results from the global asset library and the personalized asset library and ranks the combined results based on user preferences.

Item 9. The data processing system of item 8, wherein ranking the combined results is performed by a local ranking unit.

Item 10. A method for retrieving one or more assets from a personalized asset library comprising:
  receiving a search query for searching for the one or more assets in one or more asset libraries, the one or more asset libraries including the personalized asset library and each of the one or more asset libraries including a plurality of candidate assets;
  encoding the search query into one or more query embedding representations via a trained query representation machine-learning (ML) model;
  comparing, via a matching unit, the one or more query embedding representations to a plurality of asset representations, each of the plurality of asset representations being a representation of one of the plurality of candidate assets;
  identifying, based on the comparison, at least one of the plurality of the candidate assets as a search result for the search query; and
  providing the at least one of the plurality of the candidate assets for display as the search result,
  wherein the plurality of asset representations for the one or more assets in the personalized content library are generated automatically without human labeling.

Item 11. The method of item 10, wherein the one or more asset libraries includes a global asset library and the personalized asset library.

Item 12. The method of any of items 10 or 11, wherein the personalized asset library is provided to a content representation engine for converting the plurality of candidate assets in the personalized asset library to asset indices.

Item 13. The method of item 12, wherein converting the personalized asset library to asset indices occurs in an offline stage.

Item 14. The method of item 12, wherein converting the personalized asset library to asset indices is done by a local content representation engine stored locally at a client device.

Item 15. The method of any of items 10-14, wherein the request includes a selection of one asset library from among the one or more asset libraries.

Item 16. The method of any of items 10-15, wherein:
  the request includes a selection of a global asset library and the personalized asset library, and
  the matching unit combines search results from the global asset library and the personalized asset library and ranks the combined results based on user preferences.

Item 17. The method of item 16, wherein ranking the combined results is performed by a local ranking unit.

Item 18. A non-transitory computer readable medium on which are stored instructions that, when executed, cause a programmable device to perform functions of:
receiving a search query for searching for one or more assets in one or more asset libraries, the one or more asset libraries including a personalized asset library and each of the one or more asset libraries including a plurality of candidate assets;

encoding the search query into one or more query embedding representations via a trained query representation machine-learning (ML) model;

comparing, via a matching unit, the one or more query embedding representations to a plurality of asset representations, each of the plurality of asset representations being a representation of one of the plurality of candidate assets;

identifying, based on the comparison, at least one of the plurality of the candidate assets as a search result for the search query; and providing the at least one of the plurality of the candidate assets for display as the search result, wherein the plurality of asset representations for the one or more assets in the personalized content library are generated automatically without human labeling.

Item 19. The non-transitory computer readable medium of item 18, wherein the personalized asset library is provided to a content representation engine for converting the plurality of candidate assets in the personalized asset library to asset indices.

Item 20. The non-transitory computer readable medium of any of items 18 or 19, wherein:

the request includes a selection of a global asset library and the personalized asset library, and the matching unit combines search results from the global asset library and the personalized asset library and ranks the combined results based on user preferences.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An improved data processing system for personalized search and retrieval of assets comprising:

a processor; and a memory in communication with the processor, the memory comprising executable instructions that, when executed by the processor, cause the improved data processing system to perform functions of:

receiving a search query via a user interface screen of an application for searching for one or more assets for inserting into a document that is being created via the application, the user interface screen providing a first user interface element for selecting a type of visual asset to search for, a second user interface element for selecting one or more asset libraries to search for assets, and a third user interface element for entering the search query, the one or more assets being among assets that are stored in a plurality of asset libraries, the plurality of asset libraries including a personalized asset library and a global asset library, each of the plurality of asset libraries including a plurality of candidate assets;

converting the search query into one or more vector embeddings in a vector space, via a trained query representation machine-learning (ML) model;

comparing, via a matching unit, the one or more vector embeddings to a plurality of asset representations to generate a similarity score between the one or more vector embeddings and at least two of the plurality of asset representations, each of the plurality of asset representations being a representation of one of the plurality of candidate assets in a vector embedding space and each of the plurality of asset representations being stored in a content index library that corresponds to one of the plurality of asset libraries;

identifying, based on the similarity score multiple of the plurality of candidate assets as a search result for the search query, the search result combining candidate assets that are stored in different asset libraries;
ranking the search result from the different asset libraries based on user preferences; and
providing at least one of the plurality of the candidate assets for display as the search result, wherein:
the plurality of asset representations for the one or more assets in the personalized asset library are generated automatically in a zero-shot manner,
the trained query representation ML model is trained using a training dataset,
the training dataset is updated to include supplemental training data, and
the trained query representation ML model is regenerated using the updated training dataset to improve the trained query representation ML model.

2. The improved data processing system of claim 1, wherein the personalized asset library includes at least one of an enterprise asset library and a consumer asset library.

3. The improved data processing system of claim 1, wherein the personalized asset library is provided to a content representation engine for converting the plurality of candidate assets in the personalized asset library to asset indices.

4. The improved data processing system of claim 3, wherein converting the personalized asset library to asset indices occurs in an offline stage.

5. The improved data processing system of claim 3, wherein converting the personalized asset library to asset indices is done by a local content representation engine stored locally at a client device.

6. The improved data processing system of claim 1, wherein:
the search query includes a selection of the global asset library and the personalized asset library, and
the matching unit combines search results from the global asset library and the personalized asset library.

7. The improved data processing system of claim 1, wherein ranking the search result is performed by a local ranking unit.

8. A method for personalized search and retrieval of one or more assets comprising:
receiving a search query via a user interface screen of an application for searching for one or more assets for inserting into a document that is being created via the application, the user interface screen providing a first user interface element for selecting a type of visual asset to search for, a second user interface element for selecting one or more asset libraries to search for assets, and a third user interface element for entering the search query, the one or more assets being among assets that are stored in a plurality of asset libraries, the plurality of asset libraries including a personalized asset library and a global asset library, each of the plurality of asset libraries including a plurality of candidate assets;
converting the search query into one or more vector embeddings in a vector space, via a trained query representation machine-learning (ML) model;
comparing, via a matching unit, the one or more vector embeddings to a plurality of asset representations to generate a similarity score between the one or more vector embeddings and at least two of the plurality of asset representations, each of the plurality of asset representations being a representation of one of the plurality of candidate assets in a vector embedding space and each of the plurality of asset representations being stored in a content index library that corresponds to one of the plurality of asset libraries;
identifying, based on the similarity score multiple of the plurality of the candidate assets as a search result for the search query, the search result combining candidate assets that are stored in different asset libraries;
ranking the search result from the different asset libraries based on user preferences; and
providing at least one of the plurality of the candidate assets for display as the search result,
wherein:
the plurality of asset representations for the one or more assets in the personalized asset library are generated automatically without human labeling,
the trained query representation ML model is trained using a training dataset, the training dataset is updated to include supplemental training data, and
the trained query representation ML model is regenerated using the updated training dataset to improve the trained query representation ML model.

9. The method of claim 8, wherein the personalized asset library is provided to a content representation engine for converting the plurality of candidate assets in the personalized asset library to asset indices.

10. The method of claim 9, wherein converting the personalized asset library to asset indices occurs in an offline stage.

11. The method of claim 9, wherein converting the personalized asset library to asset indices is done by a local content representation engine stored locally at a client device.

12. The method of claim 8, wherein:
the search query includes a selection of the global asset library and the personalized asset library, and
the matching unit combines search results from the global asset library and the personalized asset library.

13. The method of claim 8, wherein ranking the search result is performed by a local ranking unit.

14. A non-transitory computer readable medium on which are stored instructions that, when executed, cause a programmable device to perform functions of:
receiving a search query via a user interface screen of an application for searching for one or more assets for inserting into a document that is being created via the application, the user interface screen providing a first user interface element for selecting a type of visual asset to search for, a second user interface element for selecting one or more asset libraries to search for assets, and a third user interface element for entering the search query, the one or more assets being among assets that are stored in a plurality of asset libraries, the plurality of asset libraries including a personalized asset library and a global asset library, each of the plurality of asset libraries including a plurality of candidate assets;
converting the search query into one or more vector embeddings in a vector space, via a trained query representation machine-learning (ML) model;
comparing, via a matching unit, the one or more vector embeddings to a plurality of asset representations to generate a similarity score between the one or more vector embeddings and at least two of the plurality of asset representations, each of the plurality of asset representations being a representation of one of the plurality of candidate assets in a vector embedding space and each of the plurality of asset representations being stored in a content index library that corresponds to one of the plurality of asset libraries;

identifying, based on the similarity score multiple of the plurality of the candidate assets as a search result for the search query, the search result combining candidate assets that are stored in different asset libraries;

providing at least one of the plurality of the candidate assets for display as the search result, wherein:

the plurality of asset representations for the one or more assets in the personalized asset library are generated automatically without human labeling, the trained query representation ML model is trained using a training dataset, the training dataset is updated to include supplemental training data, and the trained query representation ML model is regenerated using the updated training dataset to improve the trained query representation ML model.

15. The non-transitory computer readable medium of claim 14, wherein the personalized asset library is provided to a content representation engine for converting the plurality of candidate assets in the personalized asset library to asset indices.

16. The non-transitory computer readable medium of claim 14,
wherein:
the search query includes a selection of the global asset library and the personalized asset library, and
the matching unit combines search results from the global asset library and the personalized asset library.

* * * * *